United States Patent
Joubert et al.

(10) Patent No.: US 7,532,275 B2
(45) Date of Patent: May 12, 2009

(54) DISPLAY DEVICE WITH A WHITE-OPTIMIZING BISTABLE NEMATIC SCREEN AND METHOD FOR THE DEFINITION OF SAID DEVICE

(75) Inventors: Cécile Joubert, Orsay (FR); Daniel Stoenescu, Orsay (FR); Alexandre Carton, Calais (FR); Patrice Davi, Sevres (FR)

(73) Assignee: Nemoptic, Magny les Hameaux (FR)

( * ) Notice: Subject to any disclaimer, the term of this patent is extended or adjusted under 35 U.S.C. 154(b) by 467 days.

(21) Appl. No.: 10/580,320

(22) PCT Filed: Nov. 25, 2004

(86) PCT No.: PCT/FR2004/003021

§ 371 (c)(1),
(2), (4) Date: May 25, 2006

(87) PCT Pub. No.: WO2005/054940

PCT Pub. Date: Jun. 16, 2005

(65) Prior Publication Data

US 2007/0103619 A1  May 10, 2007

(30) Foreign Application Priority Data

Nov. 28, 2003 (FR) .................................. 03 13991

(51) Int. Cl.
*G02F 1/1335* (2006.01)
(52) U.S. Cl. .................. 349/99; 349/102; 349/129; 349/121
(58) Field of Classification Search ................. 349/180, 349/179, 121, 102, 96, 99, 129, 98; 359/72, 359/56, 76, 75, 84, 102
See application file for complete search history.

(56) References Cited

U.S. PATENT DOCUMENTS

| 5,040,876 | A  | * | 8/1991  | Patel et al.   | 349/128 |
| 5,995,173 | A  | * | 11/1999 | Barberi et al. | 349/33  |
| 6,327,017 | B2 | * | 12/2001 | Barberi et al. | 349/177 |
| 6,567,142 | B1 | * | 5/2003  | Kim            | 349/119 |
| 6,744,480 | B2 | * | 6/2004  | Kaneko         | 349/65  |
| 6,795,146 | B2 | * | 9/2004  | Dozov et al.   | 349/113 |
| 6,831,716 | B2 | * | 12/2004 | Dozov et al.   | 349/113 |
| 7,327,420 | B2 | * | 2/2008  | Zhu et al.     | 349/113 |

(Continued)

OTHER PUBLICATIONS

Dozov et al., "Fast bistable nematic display from coupled surface anchoring breaking", SPIE vo. 3015 (1997), pp. 61-69.

(Continued)

*Primary Examiner*—James P Hughes
(74) *Attorney, Agent, or Firm*—Young & Thompson (57) ABSTRACT

The invention relates to a nematic liquid crystal display having two stable states, without an electric field, obtained by anchoring break, characterized in that it comprises two polarizers (10, 40), one (10) of which is placed on the observer side, the other (40) being placed on the opposite side of the liquid crystal cell whereby the latter is at least partially reflecting in order to define a reflective mode or transflective mode. The orientation of the two polarizers (10, 40) is offset by a value which is equal to the rotatory power of the cell at approximately +/−30°.

22 Claims, 6 Drawing Sheets

U.S. PATENT DOCUMENTS

| | | | |
|---|---|---|---|
| 2003/0076455 A1* | 4/2003 | Kwok et al. | 349/99 |
| 2004/0125294 A1* | 7/2004 | Angele et al. | 349/123 |
| 2007/0159590 A1* | 7/2007 | Joubert et al. | 349/177 |
| 2008/0002107 A1* | 1/2008 | Mak et al. | 349/96 |

OTHER PUBLICATIONS

Dozov et al., "Recent improvements of bistable nematic displays switched by anchoring breaking", SID Symposium Digest of Technical Papers, vol. 32 (2001), pp. 224-227.

Guo et al., "Optical optimization of surface-controlled-bistable-twisted-nematic liquid crystal displays", Proceedings SID 2000, pp. 241-243.

Ignatov et al., "Thin crystal film polarizers and retarders", Proc of SPIE vol. 4658, 2002, pp. 79-90.

Joubert et al., "Reflective bistable nematic displays (BiNem®) fabricated by standard manufacturing equipment", Journal of the SID 2003, pp. 217-224.

Joubert et al., "Ultra low power bright reflective displays using BiNem® technology", SOD 2002, pp. 30-33.

Martinot-Lagarde et al., "Fast bistable nematic display using monostable surface anchoring switching", Proceeding SID 1997, pp. 41-44.

Ong, "Origin and characteristics of the optical properties of general twisted nematic liquid-crystal displays", J. Appl. Phys. 64 (1988), pp. 614-628.

Qian et al., "Dynamic flow, broken surface anchoring, and switching bisability in three-terminal twisted nematic liquid crystal displays", Journal of Applied Physics, vo. 90, No. 6, pp. 3123-3123 (2001).

Zhuang et al., "Parameter optimization for a reflecltive bistable twisted nematic display by use of the Poincare sphere method", Optics Letters, vol. 24, No. 16 (1999).

* cited by examiner

$$\phi_T - \phi_U = -\pi$$

$$\phi_T - \phi_U = -\pi + 2.DE$$

DISPLAY DEVICE WITH A WHITE-OPTIMIZING BISTABLE NEMATIC SCREEN AND METHOD FOR THE DEFINITION OF SAID DEVICE

FIELD OF THE INVENTION

This invention relates to the field of liquid crystal display devices and more precisely the optical configuration of a bistable nematic display operating according to an optical mode which optimizes the white state of this display.

This invention relates in particular to displays of reflective type. However, it is not limited strictly to this application. In fact, the invention also relates to the displays of transflective type.

AIM OF THE INVENTION

A general aim of this invention is to improve the white state of a bistable display device, or more precisely to obtain a reflectance of the white state of very good quality in terms of luminance and colorimetry from any viewing angle.

STATE OF THE ART

Bistable Liquid Crystal Display Switching Between Two Textures Differing by a Twist of 180°

The type of bistable liquid crystal display considered in this invention is a display which switches between two textures, that are stable without an applied electric field (from whence its bistability), different from each other by an angle of $\pi$. For one of the textures, the angle $\phi_U$ between the liquid crystal molecule directors on the two surfaces of the cell is of the order of 0 to ±30°. The molecules remain virtually parallel between themselves, and this texture will be called U. The second texture T has a twist angle $\phi_T = \phi_U \pm \pi$. The molecules carry out, in texture T, a rotation of approximately 180° (±30°) between the two surfaces of the cell. To date two displays using this principle have been described.

The nematic liquid crystal is chiralized so as to present a spontaneous pitch $p_o$ close to four times the thickness d of the cell, in order to equalize the energies of the two textures. The ratio between the thickness d of the cell and the spontaneous pitch $p_o$, i.e. $d/p_o$, is therefore approximately equal to 0.25+/−0.1, preferably 0.25±0.05. Without an electric field, they are the states of minimal energy.

Document [1] describes a display which carries out switching between the two textures U and T by applying an electric field pulse of specific shape. This display is based on a break of the anchoring of the liquid crystal molecule on one of the so-called zenithal alignment surfaces (documents [2] and [3]), i.e. that the molecule is raised by the electric field before falling back on one side or the other, thus allowing the two textures U and T to be obtained.

In this case, the structure of the electrodes necessary for the application of the field is standard, identical to that used for the liquid crystal displays of TN or STN type. This display is generally called BiNem®.

Document [4] describes a display which also uses an anchoring break and a specific type of electrode (called "comb shaped electrodes"), making it possible to obtain a lateral component of the electric field, i.e. parallel with the substrate. Switching between the two textures is carried out in this case by an effect qualified by the author as azimuthal anchoring break (document [5]).

The switching method is not essential to this invention. In fact whatever the switching mode (zenithal or azimuthal anchoring break), the textures of the liquid crystal molecules are the same, the switching taking place between two twisted textures, one texture with a low twist angle $\phi_U$ and called U, and the other texture with a high twist angle $\phi_T = \phi_U \pm \pi$ and called T. And the optical behaviour of the display depends only on the textures of the liquid crystal molecules.

Optical Modes of Such Displays

The optical mode requiring an optimization of the white is mainly the reflective mode, which uses ambient light as a light source. In this case, what is sought is obtaining a screen which most resembles black ink on white paper.

Two types of reflective mode exist:

a mode which uses two polarizers and a mirror. This mirror is generally diffusing. One of the polarizers is placed on the side of the observer. It is transmissive. The second polarizer and the mirror are by contrast placed on the rear of the display, on the opposite side with respect to the observer. The rear polarizer and the mirror can be merged. Usually the mirror (and the rear polarizer) are outside the cell, which creates an additional image shifted by twice the distance between the mirror and the cell. In order to suppress this image, the rear polarizer and the mirror would have to be integrated inside the cell. However the integration of the polarizer is not possible on an industrial scale at present.

This mode uses a cell delay of the same order of magnitude as a display operating according to a transmissive mode, comprised between $\lambda/3$ and $\lambda/2$.

a mode using a single (transmissive) polarizer on the side of the observer and a mirror placed on the rear of the cell. The advantage of this mode is that the mirror can be integrated inside the cell. In this case the two images coincide, there is no longer a parasitic image.

The reflective mode studied in detail in the literature is the mode operating with a polarizer and a mirror. For example the documents [4], [6] and [7] calculate optimum modes for a linear input polarizer. The document [8] studies this reflective mode using a circular-type input polarizer.

This mode, when the mirror is integrated in the cell, involves a complication in the manufacturing process as it is necessary to integrate into the cell a reflective and diffusing function. Moreover, the delay value $\Delta nd$ producing the best optical results is of the order of $\lambda/4$, $\lambda$ representing a visible spectrum wavelength, which is approximately two times smaller than the adapted delay value in the case of a mode with two polarizers. A reduction by a factor of two in the delay can in theory be obtained by reducing either the value of the $\Delta n$ of the liquid crystal or the thickness of the cell. The thickness recommended for a bistable display such as described previously is however already small, of the order of 2 micrometers, compared with that of a standard liquid crystal display of TN or STN type (approximately 4 to 5 micrometers) and a division of this value by two would lead to serious complications in the cell manufacturing process. A reduction in the optical anisotropy of the liquid crystal mixture whilst retaining the electric anisotropy necessary for the zenithal anchoring break is also difficult to achieve.

For these reasons, an object of this invention is the optimization of a reflective mode with two polarizers, making it possible to use commercial components and not leading to any substantial modification of the manufacturing process and of the optical delay $\Delta nd$, compared with a cell operating in transmissive mode.

Moreover, recent polarizer technologies (document [9]) make it possible to produce polarizers (of transmissive or reflective type) inside the cell, which would make it possible to suppress the parallax effect of this mode, at the cost of course of a modification in the cell manufacturing technology.

Document [10] describes the outlines of a reflective mode with two polarizers without specifying the exact configuration and the method of calculation of such configuration.

BASIS OF THE INVENTION

The above mentioned aim is achieved within the scope of this invention thanks to a nematic liquid crystal display device having two stable states, without an electric field, that are obtained by anchoring break, characterized by the fact that it comprises two polarizers, the first polarizer being placed on the side of the observer, the other polarizer being placed on the opposite side of the liquid crystal cell and said other polarizer being at least partially reflecting in order to define a reflective or transflective mode, the orientation of the two polarizers being shifted by a value equal to the rotatory power of the cell at approximately +/−30°.

According to other advantageous characteristics of the invention:

- the two stable states correspond to two textures of liquid crystal molecules the twist of which differs from 150° to 180° in absolute values.
- the orientation of the polarizer placed on the opposite side with respect to the observer, as referring to the nematic director on the associated face of the cell, being comprised within the range containing the sub-range + or − (10° to 80°) whilst the orientation of the polarizer placed on the side of the observer, as referring to the same nematic director reference, is comprised within the range comprising the sub-range from + or − (10° to 80°) for an optical delay Δnd of the order of 205±70 nm.
- for an optical delay Δnd=250+/−70 nm, in the case of a levo-rotatory liquid crystal, the orientation of the polarizer placed on the opposite side with respect to the observer, as referring to the nematic director on the associated face of the cell, is comprised within the range [−75°; −30°] U [10°; 65°], whilst the orientation of the polarizer placed on the side of the observer, as referring to the same nematic director reference, is comprised within the range [−60°; −10°] U [30°; 80°], and in the case of a dextro-rotatory liquid crystal, the orientation of the polarizer placed on the opposite side with respect to the observer, as referring to the nematic director on the associated face of the cell, is comprised within the range [−65°; −10°] U [30°; 75°], whilst the orientation of the polarizer placed on the side of the observer, as referring to the same nematic director reference, is comprised within the range [−80°; −30°] U [10°; 60°],
- for an optical delay Δnd=280+/−30 nm, in the case of a levo-rotatory liquid crystal and for brushing directions forming between themselves between 15° and 30°, the orientation of the polarizer placed on the opposite side with respect to the observer, as referring to the nematic director on the associated face of the cell, is comprised within the range [−65°; −30°] U [25°; 65°] preferentially [−50°; −40°] U [40°; 50°], whilst the orientation of the polarizer placed on the side of the observer, as referring to the same nematic director reference, is comprised within the range [−40°; −10°] U [50°; 80°] preferentially [−25°; −10°] U [64°; 80°], and in the case of a dextro-rotatory liquid crystal, for brushing directions forming between themselves between −15° and −30°, the orientation of the polarizer placed on the opposite side with respect to the observer, as referring to the nematic director on the associated face of the cell, is comprised within the range [−65°; −25°] U [30°; 65°] preferentially [−50°; −40°] U [40°; 50°], whilst the orientation of the polarizer placed on the side of the observer, as referring to the same nematic director reference, is comprised within the range [−80°; −50°] U [10°; 40°] preferentially [−80°; −64°] U [10°; 25°],
- for an optical delay Δnd=220+/−30 nm, in the case of a levo-rotatory liquid crystal and for brushing directions forming between themselves between 10° and 20°, the orientation of the polarizer placed on the opposite side with respect to the observer, as referring to the nematic director on the associated face of the cell, is comprised within the range [−60°; −30°] U [25°; 65°] preferentially [−50°; −40°] U [40°; 50°], whilst the orientation of the polarizer placed on the side of the observer, as referring to the same nematic director reference, is comprised within the range [−40°; −20°] U [50°; 70°] preferentially [−35°; −25°] U [55°; 65°], and in the case of a dextro-rotatory liquid crystal, for brushing directions forming between themselves between −10° and −20°, the orientation of the polarizer placed on the opposite side with respect to the observer, as referring to the nematic director on the associated face of the cell, is comprised within the range [−65°; −25°] U [30°; 60°] preferentially [−50°; −40°] U [40°; 50°], whilst the orientation of the polarizer placed on the side of the observer, as referring to the same nematic director reference, is comprised within the range [−70°; −50°] U [20°; 40°] preferentially [−65°; −55°] U [25°; 35°],
- for an optical delay Δnd=280+/−30 nm, in the case of a levo-rotatory liquid crystal and for brushing directions forming between themselves between 0° and +/−5°, the orientation of the polarizer placed on the opposite side with respect to the observer, as referring to the nematic director on the associated face of the cell, is comprised within the range [−75°; −35°] U [15°; 55°] preferentially [−60°; −50°] U [30°; 40°], whilst the orientation of the polarizer placed on the side of the observer, as referring to the same nematic director reference, is comprised within the range [−50°; −20°] U [40°; 70°] preferentially [−40°; −30°] U [50°; 60°], and in the case of a dextro-rotatory liquid crystal, for brushing directions forming between themselves between 0° and +/−5°, the orientation of the polarizer placed on the opposite side with respect to the observer, as referring to the nematic director on the associated face of the cell, is comprised within the range [−55°; −15°] U [35°; 75°] preferentially [−40°; −30°] U [50°; 60°], whilst the orientation of the polarizer placed on the side of the observer, as referring to the same nematic director reference, is comprised within the range [−70°; −40°] U [20°; 50°] preferentially [−60°; −50°] U [30°; 40°],
- for an optical delay Δnd=220+/−30 nm, in the case of a levo-rotatory liquid crystal and for brushing directions forming between themselves between 0° and +/−5°, the orientation of the polarizer placed on the opposite side with respect to the observer, as referring to the nematic director on the associated face of the cell, is comprised within the range [−65°; −40°] U [20°; 60°] preferentially [−55°; −45°] U [35°; 45°], whilst the orientation of the polarizer placed on the side of the observer, as referring to the same nematic director reference, is comprised within the range [−60°; −20°] U [30°; 70°] preferentially

[−45°; −35°] U [45°; 55°], and in the case of a dextro-rotatory liquid crystal, for brushing directions forming between themselves between 0° and +/−5°, the orientation of the polarizer placed on the opposite side with respect to the observer, as referring to the nematic director on the associated face of the cell, is comprised within the range [−60°; −20°] U [40°; 65°] preferentially [−45°; −35°] U [45°; 55°], whilst the orientation of the polarizer placed on the side of the observer, as referring to the same nematic director reference, is comprised within the range [−70°; −30°] U [20°; 60°] preferentially [−55°; −45°] U [35°; 45°], for an optical delay $\Delta nd=220+/-30$ nm, in the case of a levo-rotatory liquid crystal and for brushing directions forming between themselves between 0° and +/−5°, the orientation of the polarizer placed on the opposite side with respect to the observer, as referring to the nematic director on the associated face of the cell, is comprised within the range [−80°; −50°] U [10°; 60°], whilst the orientation of the polarizer placed on the side of the observer, as referring to the same nematic director reference, is comprised within the range [−50°; −25°] U [45°; 65°], and in the case of a dextro-rotatory liquid crystal, for brushing directions forming between themselves between 0° and +/−5°, the orientation of the polarizer placed on the opposite side with respect to the observer, as referring to the nematic director on the associated face of the cell, is comprised within the range [−60°; −10°] U [50°; 80°], whilst the orientation of the polarizer placed on the side of the observer, as referring to the same nematic director reference, is comprised within the range [−65°; 45°] U [25°; 50°], for an optical delay $\Delta nd=280+/-30$ nm, in the case of a levo-rotatory liquid crystal and for brushing directions forming between themselves between 5° and 30°, taking account of an elastic uncoupling between 1° and 12°, the orientation of the polarizer placed on the opposite side with respect to the observer, as referring to the nematic director on the associated face of the cell, is comprised within the range [−65°; −45°] U [25°; 55°], whilst the orientation of the polarizer placed on the side of the observer, as referring to the same nematic director reference, is comprised within the range [−40°; −10°] U [50°; 80°], and in the case of a dextro-rotatory liquid crystal, for brushing directions forming between themselves between −5° and 30°, taking account of an elastic uncoupling between 1° and 12°, the orientation of the polarizer placed on the opposite side with respect to the observer, as referring to the nematic director on the associated face of the cell, is comprised within the range [−55°; −25°] U [45°; 65°], whilst the orientation of the polarizer placed on the side of the observer, as referring to the same nematic director reference, is comprised within the range [−80°; −50°] U [10°; 40°], for an optical delay $\Delta nd=220+/-30$ nm, in the case of a levo-rotatory liquid crystal and for brushing directions forming between themselves between 5° and 15°, taking account of an elastic uncoupling between 1° and 12°, the orientation of the polarizer placed on the opposite side with respect to the observer, as referring to the nematic director on the associated face of the cell, is comprised within the range [−65°; −40°] U [25°; 50°] preferentially [−60°; −45°] U [30°; 45°], whilst the orientation of the polarizer placed on the side of the observer, as referring to the same nematic director reference, is comprised within the range [−50°; −20°] U [40°; 65°] preferentially [−40°; −30°] U [48°; 60°], and in the case of a dextro-rotatory liquid crystal, for brushing directions forming between themselves between −5° and −15°, taking account of an elastic uncoupling between 1° and 12°, the orientation of the polarizer placed on the opposite side with respect to the observer, as referring to the nematic director on the associated face of the cell, is comprised within the range [−50°; −25°] U [40°; 65°] preferentially [−45°; −30°] U [45°; 60°], whilst the orientation of the polarizer placed on the side of the observer, as referring to the same nematic director reference, is comprised within the range [−65°; −40°] U [20°; 50°] preferentially [−60°; −48°] U [30°; 40°], for an optical delay $\Delta nd=250+/-70$ nm, in the case of a levo-rotatory liquid crystal and for brushing directions forming between themselves between 0° and +/−5°, taking account of an elastic uncoupling between 1° and 12°, the orientation of the polarizer placed on the opposite side with respect to the observer, as referring to the nematic director on the associated face of the cell, is comprised within the range [−70°; −40°] U [20°; 55°], whilst the orientation of the polarizer placed on the side of the observer, as referring to the same nematic director reference, is comprised within the range [−60°; −25°] U [30°; 65°], and in the case of a dextro-rotatory liquid crystal, for brushing directions forming between themselves between 0° and +/−5°, taking account of an elastic uncoupling between 1° and 12°, the orientation of the polarizer placed on the opposite side with respect to the observer, as referring to the nematic director on the associated face of the cell, is comprised within the range [−55°; −20°] U [40°; 70°], whilst the orientation of the polarizer placed on the side of the observer, as referring to the same nematic director reference, is comprised within the range [−65°; −30°] U [25°; 60°].

This invention also proposes a method for the optimization of the orientation of two polarizers in a nematic liquid crystal display device presenting two stable states by anchoring break, one of the polarizers being placed on the observer side whilst the other polarizer is placed on the opposite face of the liquid crystal cell and said other polarizer being at least partially reflecting in order to define a reflective or transflective mode, characterized by the fact that it comprises the steps consisting of:

calculating the rotatory power PR using a formula which utilizes the optical delay $\Delta nd$, the twist $\phi$ and the wavelength $\lambda$,     fixing the orientation A of the output polarizer equal to P+PR, P representing the orientation of the polarizer on the opposite side with respect to the observer and PR the rotatory power,     researching the values of P which produce the lowest resultant transmission value for the twist $\phi$ increased by $\pi$ and     deducing A from it.

BRIEF DESCRIPTION OF THE SEVERAL VIEWS OF THE DRAWINGS

Other characteristics, aims and advantages of this invention will become apparent on reading the detailed description which follows, and with reference to the attached drawings, given as non-limitative examples and in which.

DETAILED DESCRIPTION OF THE INVENTION

The inventors propose a process which makes it possible to obtain a two polarizer optical mode which is preferentially reflective, for a cell [$\phi_U$; $\phi_T$], optimized in order to obtain a very good overall optical quality of the white state and taking account of certain industrial constraints.

The inventors also propose to apply this process to a real cell, i.e. taking account of a so called "finite" azimuthal anchoring (i.e. not infinitely strong) for example on one of the alignment layers. In this case, the two textures differ by a difference angle of π. Of course, this invention also applies to the case of a display in which the azimuthal anchoring is finite on the two alignment layers, i.e. on the two faces of the display.

When seeking to optimize a reflective mode, the ideal is to get close to the quality of black ink on white paper. The preponderant parameter is therefore the quality of the white, characterized by its luminance and its colour over all of the half plane of vision of the screen.

The texture of best overall optical quality will therefore be chosen for the white. The texture T has a wavelength dispersion which is weaker and an optical stability according to the viewing angle greater than the texture U, and will therefore be chosen for the white.

In order to obtain a correct black with the texture U, it is necessary to have a delay Δnd of the cell not too far away from λ/2, λ representing a wavelength of the visible spectrum.

Calculation Process for the Optimization of the Reflective Mode of a Cell [φ; φ±π]

The process proposed by the inventors consists of calculating the optimum optical mode producing the best white for several values of delay Δnd. The delay value finally chosen will depend on the desired quality of white-contrast compromise.

The orientations of the polarizers which maximize the white and minimize the black for a "go and return path" are the same as those which maximize the white and minimize the black for a "single go path". On the other hand, if Tas is the optical transmission of the cell for a "single go path", $T_R$=Tas² is the transmission for a "go and return path" which makes it possible to calculate the performances of the reflective display (Luminance, contrast, colour). The black, therefore the contrast, is very clearly improved during a go and return path through the cell compared to a single go path.

Optical Characteristics of a Liquid Crystal Cell

Figure 1:
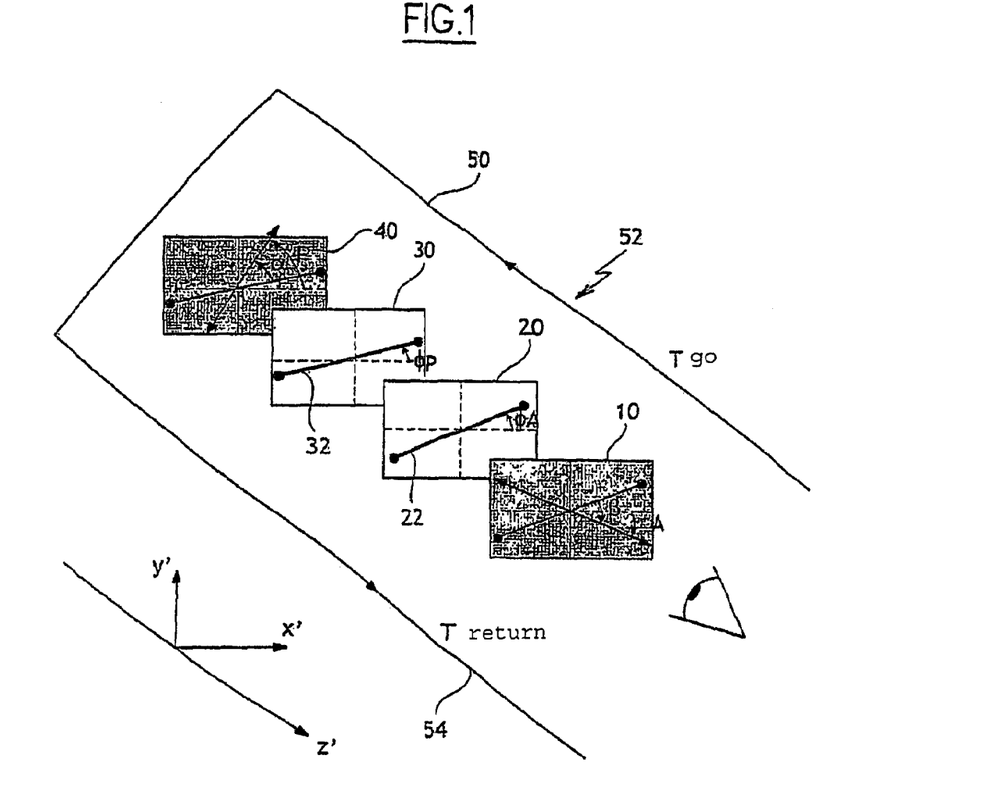
FIG. 1 diagrammatically represents a liquid crystal cell according to this invention and defines the angles used in the rest of the description, FIG. 2 diagrammatically represents the angles $\psi$ and w characteristic of an elliptical polarization.

FIG. 1, which is attached, diagrammatically represents a liquid crystal display cell according to this invention comprising:
an analyser polarizer 10 on the observer side,
two plates 20, 30 confining the nematic liquid crystal molecules separated by a distance d, and
a polarizer 40 associated with a reflector, arranged on the rear of the display, i.e. on the opposite side with respect to the observer.

In FIG. 1, which is attached, the arrow 50 diagrammatically represents the path of the light rays, the section 52 representing the go part (of which optical transmission is Tgo) of the path of the light rays which pass through the analyser 10 and the cell created by the plates 20, 30 before reaching the polarizer 40, whilst the section 54 represents the return part (of which optical transmission is Treturn) of the path of the rays reflected on the polarizer 40.

As indicated previously the transmission Treflective=Tgo×Treturn=T²return, because Tgo=Treturn.

An orthonormalized reference x', y', z' is represented in FIG. 1, the directions x', y' of which define a plane perpendicular to the direction of propagation of the light rays and z' is parallel to this direction of propagation.

The nematic director of the molecules on the plate 20, (i.e. the anchoring direction on this plate 20) is referenced 22. The nematic director on the plate 30 is referenced 32.

The anchorings on the plates 20 and 30 are adapted to allow switching of the nematic liquid crystal molecules between two stable states U and T respectively, which differ from one another by a twist of the order of π, by the application of electrical signals applied to electrodes provided on the plates 20 and 30 according to the known modalities described in the documents mentioned previously.

Such a liquid crystal cell is characterized by:
its delay Δnd, which is a product of the difference of the indexes Δn of the liquid crystal and the thickness d of the cell
its twist φ
the angles P and A formed respectively by the rear polarizer 40 and the front polarizer/analyser 10 with a fixed reference (which according to FIG. 1 arbitrarily coincides with the x' axis).

In the case of a reflective cell, the light which illuminates the screen is the ambient light situated on the side of the observer. The polarizer 40 of FIG. 1 is therefore of reflective type and the output polarizer 10 (side of the observer) is of transmissive type.

The angles which are formed respectively by the polarizer 40 and the analyser 10 with the liquid crystal director situated on the same side are called α and β.

If $\phi_P$ and $\phi_A$ are the angles formed by the directors 22, 32 on the two plates 20 and 30 with respect to the x' axis of the reference x' y' z', then:

$$P=\alpha+\phi_P \text{ and } A=\beta+\phi_A$$

The value of the twist of the liquid crystal cell is obtained by doing the difference between the director 22 of the liquid crystal on one of the faces 20 of the cell and the director 32 on the other face 30: $\phi=\phi_A-\phi_P$ In order to simplify the notations we will take the liquid crystal director 32 on the polarizer side 40 along x' i.e. $\phi_P=0$ and $\phi_A=\phi$, hence: P=α and A=β+φ

Calculation of the Transmission of a Twisted Liquid Crystal Cell

The analytical form of the optical transmission of a liquid crystal cell as a function of the parameters Δnd, Φ, P (or α) and A (or β), is given in numerous publications (Document 11 or 12 for example), for polarized light.

Here the transmission of a single "return path" will be considered, which will be called Trs, to the extent where as indicated previously, the orientations of the polarizers which maximize the white are the same for a single path and for a go and return path.

Document [12] for example gives the following formula used by the inventors:

$$Trs(\phi, \lambda) = \cos^2(\alpha + \beta) - \qquad [1]$$
$$\cos^2 X \cos 2\alpha \cos 2\beta \left[\frac{\phi}{X}\tan X - \tan 2\alpha\right]\left[\frac{\phi}{X}\tan X + \tan 2\beta\right]$$

with $$X(\phi, \lambda) = \sqrt{\phi^2 + \left(\frac{\pi \Delta n d}{\lambda}\right)^2} \qquad [2]$$

Formula [1] can also be obtained as a function of A and P instead of $\alpha$ and $\beta$.

Characteristics of the Polarization after Passing Through the Liquid Crystal Layer The inventors used the Poincaré formalism, which describes the different possible polarization states as well as the evolution of the polarization during its propagation in the cell by a plot on a sphere called a Poincaré sphere (Documents [13] or [14]).

This very powerful tool for those who can visualize in three-dimensional space allows a better comprehension of the optical effect of the liquid crystal cell for the highly twisted texture (twist of the order of $\pi$).

The principal result obtained by the inventors thanks to this tool is that for the texture T (twist $\phi_T$ of the order of $\pi$) is, for cell delays $\Delta$nd less than or equal to $\lambda/2$ ($\lambda$ wavelength of the visible spectrum), equivalent to a virtually perfect rotatory power PR. This signifies that whatever the input polarization angle, the output polarization Pout is weakly elliptical (nearly linear) and the major axis of this ellipse forms an angle PR with respect to the input polarization.

Figure 2:
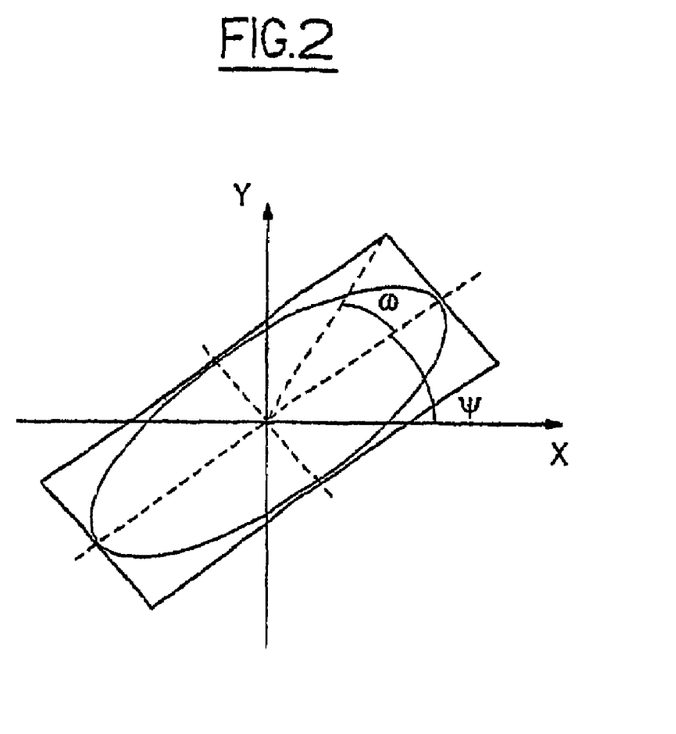

The output polarization Pout, which is a priori any polarization and thus elliptical, can be characterized by 2 angles $\psi$ and $\omega$. $\psi$ is the angle formed by the major axis of the ellipse with x' and $\omega$ characterizes the ellipticity of the polarization (see FIG. 2).

We have (for the single return path) $\psi$=P+PR

Thanks to the Poincaré sphere it is also possible to obtain the analytical form of PR and $\omega$:

$$PR \cong \phi - \arctan\left(\frac{\phi}{X}tgX\right) \qquad [3]$$

$$\sin 2\omega = 2\sin\eta \sin X (\cos 2\alpha \cos\eta \sin X + \sin 2\alpha \cos X) \qquad [4]$$

with $\cos\eta = \frac{\phi}{X}$.

Formula [3] is valid as a first approximation, when X is close to $\pi$, which is always true in the cases dealt with within the scope of this invention.

Annulation of the ellipticity $\omega$ is equivalent to obtaining at the cell output a linear polarization, i.e. a configuration where a perfect black or a white can be obtained with the analyser 10.

The fact that formula [3] makes it possible to predict the value of the rotatory power PR makes it possible to calculate the angle $\psi$ of the output polarization Pout. The configuration for A (i.e. the orientation of the analyser 10) producing the best white for a given P (P representing the orientation of polarizer 40) is A parallel to $\psi$.

i.e. $A=P+PR$ [5]

The condition which annuls the ellipticity $\omega$ is $$X = \pi. \text{ i.e.:} \qquad [6]$$

$$\phi_{opt} = \pi \sqrt{1 - \left(\frac{\Delta n d}{\lambda_0}\right)^2}$$

Thus when $\lambda$ is fixed, a relationship exists between $\phi$ and $\Delta$nd making it possible to obtain a linear output polarization Pout. The value of $\phi$ calculated with Formula [6] for a given delay will be called $\phi_{opt}$.

Calculation of the Optimal Configuration—Case where the Parameter $\phi$ is Free The optimal configuration is calculated for a cell delay $\Delta$nd and a given wavelength $\lambda$.

Formula [6] makes it possible to calculate the optimal $\phi$ value $\phi_{opt}$ for the chosen delay $\Delta$nd.

Optimisation of the White

From the fixed values of $\Delta$nd, $\phi_{opt}$ and $\lambda$, the value of the rotatory power PR is calculated with formula [3].

In order to obtain an optimum white the output analyser 10, or A, must be placed parallel to Pout (Formula [5]):

i.e. $A=P+PR$

Investigation of the Best Black

A (or $\beta$) is replaced by its value as a function of P (or $\alpha$) in the transmission formula $T_{Reflective}=Trs^2$ with Trs as defined by Formula [1], with $\phi_U=\phi_T+\pi$ The only remaining variable is P (or $\alpha$). The value of P (or $\alpha$) is sought which produces the lowest value of $Trs^2$. Once P is determined, the value of A is obtained using formula [5].

Calculation Examples—Case where the Parameter $\phi$ is Free

Table 1 describes the optimal reflective optical configurations for different delay values equal to $\lambda/2$ within the range of the visible spectrum (400 nm for the blue to 620 nm for the red). The parameter $\phi$ is chosen equal to $\phi_{opt}$ for each delay value. In order to estimate the performances of these configurations and to compare them to each other, the value of the normalized luminances of the black state and of the white state calculated over all of the visible spectrum, are also shown in Table 1 as well as the contrast CR ratio of the two luminances.

The normalized luminances are calculated as follows:

$$L = \frac{\int T_R(\lambda)\bar{y}(\lambda)s(\lambda)d\lambda}{\int \bar{y}(\lambda)s(\lambda)d\lambda}$$

with $T_R(\lambda)$ the optical transmission of the liquid crystal cell for a go and return path, y($\lambda$) the sensitivity of the eye and s($\lambda$) the spectrum of the illumination source, which is assumed to be constant and equal to 1 (so-called "flat" spectrum).

The calorimetric coordinates x, y of the white (CIE system), which are very important for the visual rendition of the screen are also calculated.

It should be remembered that the perfectly neutral white has coordinates (0.333; 0.333).

For all the delays Δnd considered in Table 1, the white is very close to 1, as the texture T functions optimally, the output polarization being linear for the case $\phi_{opt}$. The colour of the white remains close to theoretical white (0.333; 0.333) for all cases. However, a "yellowing" is noted when the delay increases.

To this extent, the values corresponding to a delay Δnd of less than 230 nm are preferred.

Black is obtained with the texture U. It is therefore optimized when this texture has a delay of λ/2 for the wavelength where the eye is most sensitive.

In Table 1 the best theoretical contrast value for the delay 275 nm is found, which corresponds to λ/2 for 550 nm, which is the peak sensitivity for the eye. The contrast value for 275 nm is very high, due to the double passage in the cell. This double passage also makes it possible to obtain good contrast values (>50) over a significant range of delays.

A satisfactory configuration for the contrast is in theory a delay of 275 nm, but a lower delay (230 nm or 200 nm) makes it possible to obtain a more colorimetrically-neutral white and would therefore be preferred, as indicated above. The delay chosen will depend on the desired compromise.

All of these configurations have, a priori, performances which are acceptable for a screen in reflective mode.

Figure 3:
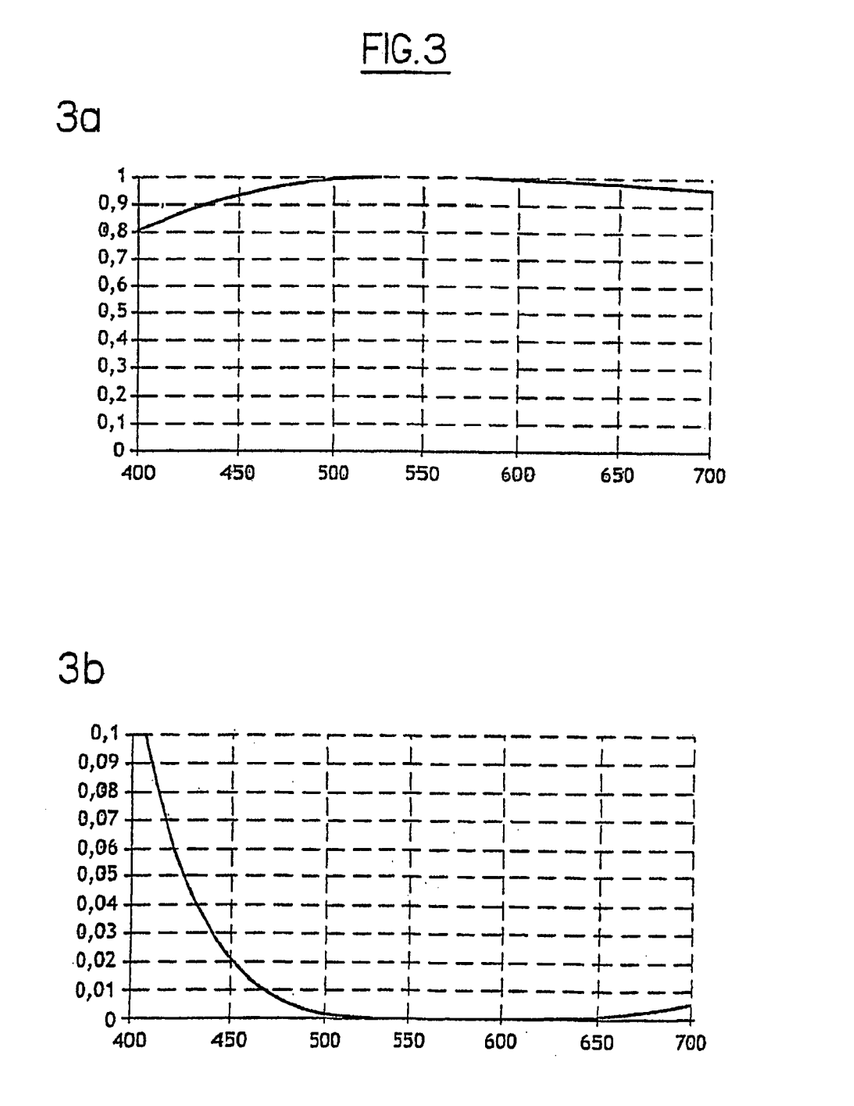
FIG. 3 represents the optical transmission of the configuration (Δnd=275 nm, φopt=−156°) described in Table 1 as a function of the wavelength, respectively for the white state in FIG. 3a and for the black state in FIG. 3b, FIG. 4 diagrammatically represents the brushing directions on the analyser and polarizer side and the orientations of the liquid crystal molecules on the alignment layers for the case of an infinitely strong azimuthal anchoring.

By way of illustration the optical transmissions $T_R$ of the white and black states corresponding to the delay 275 nm of Table 1 are given in FIG. 3 as a function of wavelength.

Figure 4:
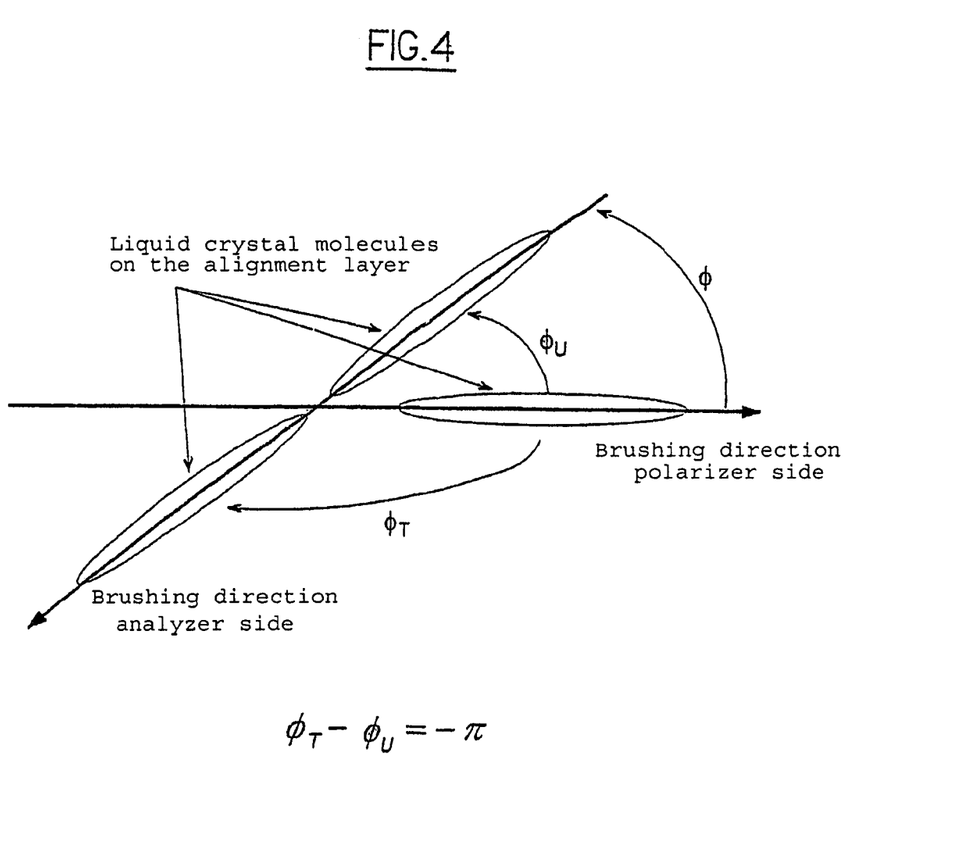

Production of the Liquid Crystal Cell—Case of Infinitely Strong Azimuthal Anchoring When the azimuthal anchoring of the liquid crystal molecule on the alignment layer is infinitely strong, the director 22, 32 of the liquid crystal molecule on each face 20, 30 of the cell is determined by the brushing direction of the alignment layer (of polyimide chemical type for example) used on this face. Actually for an infinitely strong azimuthal anchoring, the liquid crystal director aligns parallel to the brushing direction (see FIG. 4). In this case, a precise value of ϕ is obtained by fixing the brushing directions of the two alignment layers on the production machine of the display, such that between them they form an angle ϕ.

Calculation of the Optimal Configuration—Case where the Parameter ϕ* is Imposed

The brushing directions of the cell can be imposed, for example, by the industrial method. In this case, the calculation of the best configuration for the polarizer 40 or P and the analyser 10 or A according to the criteria of the best white is carried out in the following way:

Optimization of the White

From the fixed values of Δnd, $\phi_{imposed}$ and λ, the value of the rotatory power PR is calculated with formula [3].

In order to obtain an optimum white A must be parallel to Pout (formula [5]):

i.e. $A = P + PR$

Investigation of the Best Black

A (or β) is replaced by its value as a function of P (or α) in the transmission formula $T_R = Trs^2$, with $\phi_u = \phi_T + \pi$. The only remaining variable is P (or α). The value of P (or α) is sought which produces the lowest value of $Trs^2$. Once P has been determined, the value of A is obtained using formula [5].

Calculation Examples—Case where the Parameter ϕ* is Imposed

Table 2 describes the optimal reflective optical configurations for different delay values close to λ/2. The parameter $\phi_{imposed}$ is chosen such that $\phi_T = -180°$ $\phi_u = 0°$.

The performances of the reflective mode for ϕ=0° are close to those obtained for $\phi_{opt}$. The white is slightly less good (by approximately 5%) because the texture T is not at the optimum, but the output polarization remains very weakly elliptical, which guarantees a good white level.

The more the delay reduces, the more the condition $\phi_{opt}$ is approached ($\phi_{opt}$ approaches −180° when the delay reduces). For 200 nm, the white is very close to 1. The yellowing effect is again apparent when the delay increases.

The black is produced by a texture U without twist which acts, as previously, as a birefringent plate. The maximal value of the contrast corresponds as previously to a delay of 275 nm, but the contrast remains high for the other delays because of the double passage.

The best configuration for the contrast is a delay of 275 nm, but a lower delay (230 nm or 200 nm) makes it possible to obtain a more colorimetrically-neutral white. The chosen delay depends on the desired compromise.

All of these configurations have performances which are acceptable for a screen in reflective mode.

Figure 5:
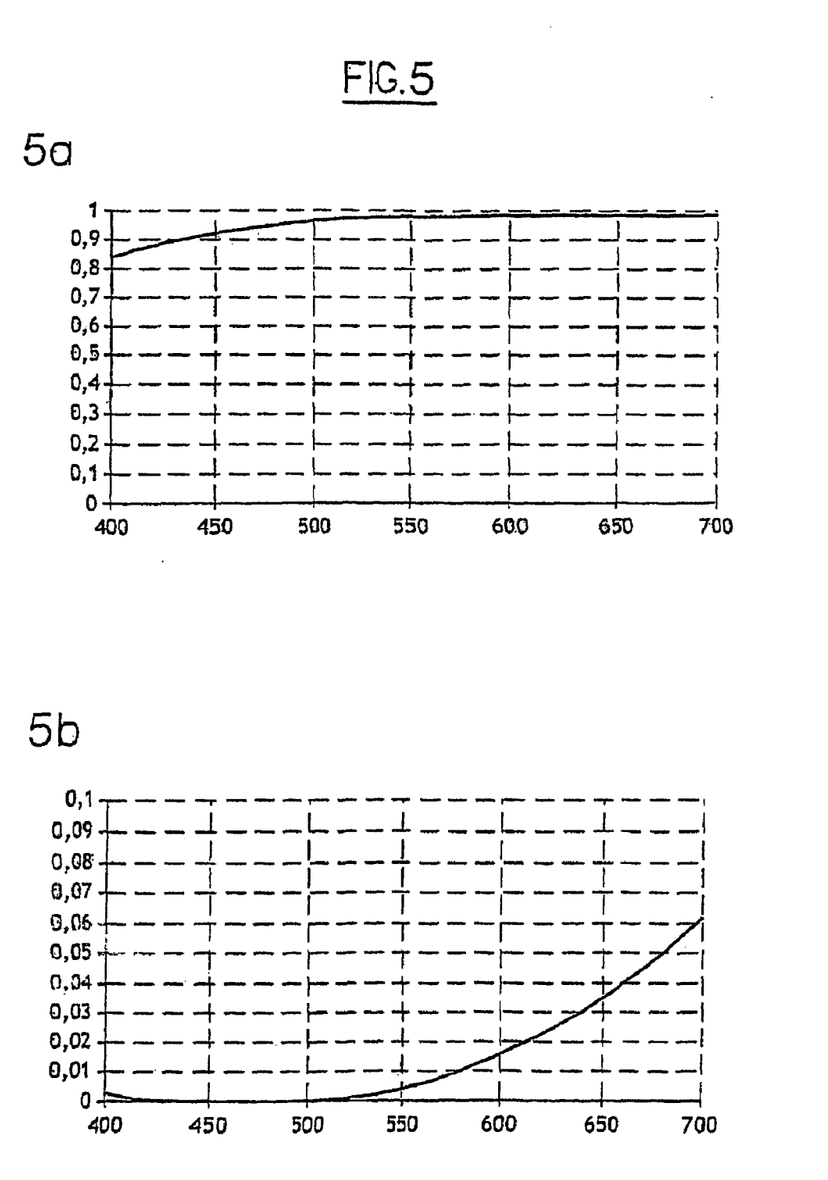
FIG. 5 represents the optical transmission of the configuration (Δnd=230 nm, φ imposed at φu=0° and φT=−180°) described in Table 2 as a function of the wavelength, respectively for the white state in FIG. 5a and for the black state in FIG. 5b, and FIG. 6 diagrammatically represents a similar view to FIG. 4 for the case of a finite azimuthal anchoring on the plate of the cell situated on the side of the analyser.

By way of illustration the optical transmissions $T_R$ of the white and black states corresponding to the delay 230 nm of Table 2 are given in FIG. 5 as a function of the wavelength.

Improvement in the Colorimetric Neutrality of the White

A solution for improving the colorimetric neutrality of the white is to adjust the polarizers 10 or A and 40 or P to angles which are close to but different from those calculated by the method described previously. In this case, the condition on the rotatory power which guarantees the most luminous white is no longer strictly respected. In fact, a loss of luminance of the white is accepted in order to improve the colorimetry. An example is given in Table 2' for a delay of 230 nm and an imposed ϕ such as for Table 2 ($\phi_{imposed}$ is chosen such that $\phi_T = -180°$ $\phi_u = 0°$).

It should be noted that for the angles of P and A in Table 2', the contrast has been divided by 2 with respect to the calculated solution of Table 2, but remains acceptable. The colour of the white has been modified, it is slightly bluish and closer to theoretical white.

Transflective Mode

All of the calculations described above can be applied to the intermediate optical mode called transflective, for which the rear polarizer 40 or P is transflective, i.e. partially reflecting: one part of the polarized light is transmitted, the other part is reflected. This allows the screen to operate either in transmissive mode when it is illuminated by a "back light", or in reflective mode using ambient light as a light source when it is not back lighted. Optimization of the white is identical for the reflective and transflective modes, but for the latter the quality of the black is low when it operates in transmissive mode (the black is not optimized since the light carries out a "single go path" through the cell instead of a "go and return path" for the reflective mode).

Real Case of a Finite Azimuthal Anchoring

When the azimuthal anchoring is finite (not infinitely strong), the elastic forces which act on the molecules close to the surface due to the chiral doping of the liquid crystal mixture, make these molecules "uncouple", i.e. that the director 22, 32 of the liquid crystal is no longer strictly parallel to the brushing direction, but shifted by an angle DE called "elastic uncoupling". In order to simplify the disclosure of the invention regarding this point, it is assumed that a single anchoring layer has a finite azimuthal anchoring, the other layer having an infinitely strong azimuthal anchoring. The uncoupling moves in the direction of reducing the absolute value of the twist of low value $\phi_U$, which becomes, for example, $\phi_U$–DE for $\phi_U$>0, and reducing the absolute value of the twist of high value $\phi_T$, which becomes, for example, $\phi_T$+DE for $\phi_T$<0 (see FIG. 6).

The angle formed by the brushing directions between themselves is called $\phi^*$. Due to the uncoupling we have:

$$\phi_T - \phi_U = -\pi + 2DE$$

The elastic uncoupling is directly connected to the azimuthal anchoring force characterized by its extrapolation length Laz according to the relationship:

$$DE = \frac{\pi \cdot L_{az}}{2d}$$

A finite azimuthal anchoring typically has a Laz of the order of 100 to 200 nm, i.e. DE comprised between a few degrees and approximately 15°. The parameter DE is a physical parameter which can be measured experimentally, and therefore assumed to be known.

Values of DE of 5° et 10° will be chosen for the following examples.

Case where the Parameter $\phi^*$ is Free

The optimal values of $\phi^*$ will now be calculated as a function of the uncoupling DE, as well as the corresponding optical configuration.

For each delay $\Delta$nd the optimal value of the twist as defined by the formula [6] is called $\phi_{opt}$.

Figure 6:
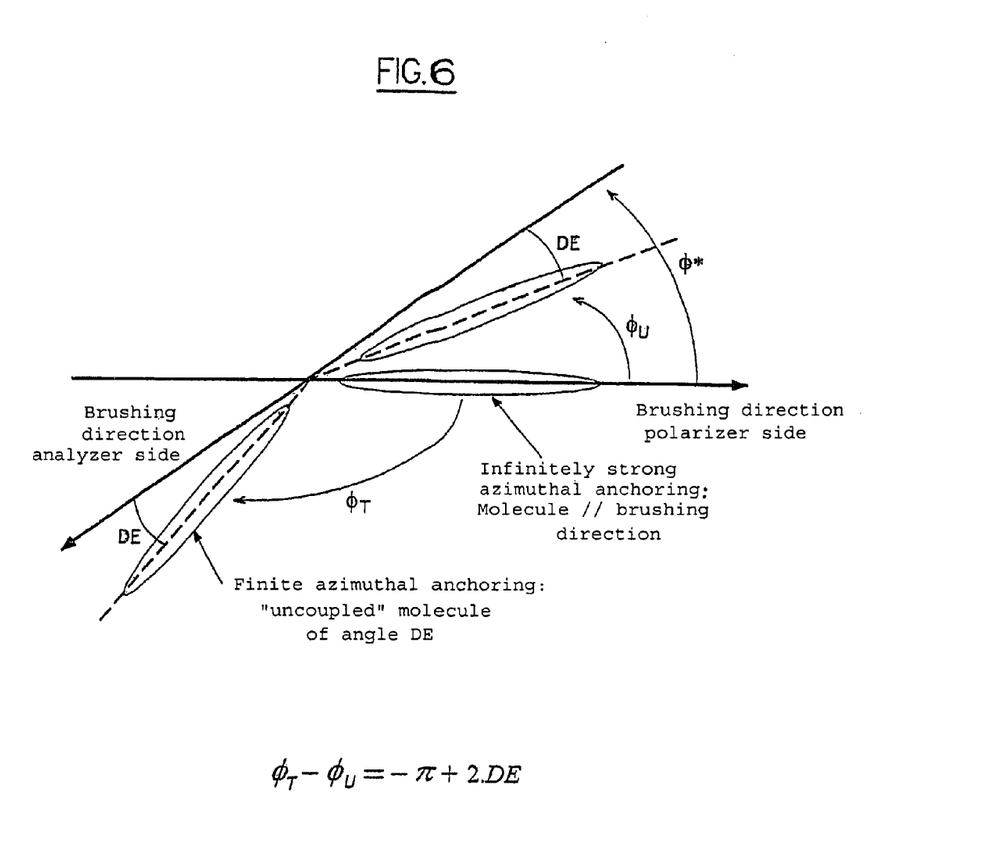

The effective value of the high twist $\phi_T$ is (cf FIG. 6):

$$\phi_T = -\pi + \phi^* + DE$$

One wants $\phi_T = \phi_{opt}$ hence $$\phi^* = \pi + \phi_{opt} - DE$$

The rotatory power PR is calculated for ($\Delta$nd, $\phi_{opt}$) using formula [3], then the relationship between A and P is introduced into the formula of $T_R$ for $\phi_U = \phi^* - DE$, and the values of P which minimize the transmission $T_R$ are sought numerically.

The optimal optical configurations are calculated for the three delay values 310 nm, 275 nm and 230 nm, and for the 2 values of DE 5° and 10°, respectively in Tables 3, 4 and 5.

It should be noted in these tables that in the presence of elastic uncoupling, it is possible to optimize the brushing directions ($\phi^*$) in order to obtain good performances of the reflective mode: the white is for all cases very close to 1. The highest contrast corresponds as previously to a delay of 275 nm, but it remains acceptable for the other delay values considered.

All of these configurations have performances which are acceptable for a screen in reflective mode.

Case where the Parameter $\phi^*$ is Imposed

For practical reasons relating to industrial method or to the correct operation of the display, the brushing direction of the cells $\phi^*$ can be imposed, typically at 0° for example.

The effective value of $\phi_T$ in this case is (cf FIG. 6):

$$\phi_T = -\pi + \phi^* + DE$$

The rotatory power PR is calculated for the corresponding value of $\phi_T$, then, as previously, the value of A as a function of P resulting from formula 5 is introduced into the $T_R$ formula for $\phi_U = \phi^* - DE$ and the values of P which minimize the transmission $T_R$ are sought. The results for the 3 preceding values of delays are given in Tables 6, 7 and 8 respectively.

It is noted in these tables that in the presence of elastic uncoupling and with $\phi^*$ imposed at 0°, it is possible to obtain good performances of the reflective mode the white is for all cases very close to 1. The highest contrast corresponds as previously to a delay of 275 nm, but it remains acceptable for the other delay values considered.

All of these configurations have performances which are acceptable for a screen in reflective mode.

From these calculated configurations, it is of course possible to modify the colorimetry of the white at the cost of a reduction in contrast by adjusting the angles of A and P as described in the case of the strong azimuthal anchoring.

The calculations described in this paragraph also apply to the transflective mode.

TABLE 1 optimal configurations for different delay values, with $\Phi = \Phi_{opt}$

| $\Delta$nd | $\Phi_U$ | $\Phi_T = \Phi_U - \pi$ opt | P | A | Lwhite $\Phi_T = \Phi_U - \pi$ | Lblack $\Phi_U$ | CR | X | Y |
|---|---|---|---|---|---|---|---|---|---|
| 310 nm | 31° | −149° | −45° 45° | −14° 76° | 0.99 | 0.011 | 89 | 0.34 | 0.348 |
| 275 nm | 24° | −156° | −45° 45° | −21° 69° | 0.993 | 0.00071 | 1340 | 0.338 | 0.342 |
| 230 nm | 16.5° | −163.5° | −45° 45° | −28.5° 61.5° | 0.996 | 0.006 | 164 | 0.335 | 0.338 |
| 200 nm | 12° | −168° | −45° 45° | −33° 57° | 0.998 | 0.033 | 29 | 0.334 | 0.336 |

TABLE 2 optimal configurations for different delay values, with $\Phi$ imposed.

| $\Delta$nd | $\Phi_U$ imp | $\Phi_T = \Phi_U - \pi$ imp | P | A | Lwhite $\Phi_T = \Phi_U - \pi$ | Lblack $\Phi_U$ | CR | X | Y |
|---|---|---|---|---|---|---|---|---|---|
| 310 nm | 0° | −180° | −57° 33° | −33.5° 56.5° | 0.902 | 0.0038 | 236 | 0.354 | 0.358 |

TABLE 2-continued optimal configurations for different delay values, with Φ imposed.

| Δnd | $\Phi_U$ imp | $\Phi_T = \Phi_U - \pi$ imp | P | A | Lwhite $\Phi_T = \Phi_U - \pi$ | Lblack $\Phi_U$ | CR | X | Y |
|---|---|---|---|---|---|---|---|---|---|
| 275 nm | 0° | −180° | −54° 36° | −35° 55° | 0.945 | 0.0005 | 1882 | 0.345 | 0.349 |
| 230 nm | 0° | −180° | −52° 38° | −38° 52° | 0.978 | 0.0079 | 123 | 0.338 | 0.34 |
| 200 nm | 0° | −180° | −50.5° 39.5° | −39.5° 50.5° | 0.989 | 0.037 | 27 | 0.336 | 0.337 |

TABLE 2' configuration "modified" in order to improve the colorimetry of the white, delay 230 nm and Φ imposed.

| Δnd | $\Phi_U$ imp | $\Phi_T = \Phi_U - \pi$ imp | P | A | Lwhite $\Phi_T = \Phi_U - \pi$ | Lblack $\Phi_U$ | CR | x | y |
|---|---|---|---|---|---|---|---|---|---|
| 230 nm idem Tab 2 | 0° | −180° | −52° 38° | −38° 52° | 0.978 | 0.0079 | 123 | 0.338 | 0.34 |
| 230 nm modif | 0° | −180° | −70° 20° | −33° 57° | 0.83 | 0.012 | 67 | 0.317 | 0.321 |

TABLE 3 example of solutions for different elastic uncoupling values for (Δnd = 310 nm; $\Phi_{opt}$ = −149°; λ = 550 nm), Φ* free

| DE | Φ* | $\Phi_U$ | P | A | Lwhite $\Phi_T$ | Lblack $\Phi_U$ | CR |
|---|---|---|---|---|---|---|---|
| 5° | 26° | 21° | −50° 40° | −19° 71° | 0.989 | 0.0098 | 101 |
| 10° | 21° | 11° | −55° 35° | −24° 66° | 0.989 | 0.0066 | 150 |

TABLE 4 example of solutions for different elastic uncoupling values for (Δnd = 275 nm; $\Phi_{opt}$ = −156°; λ = 550 nm), Φ* free

| DE | Φ* | $\Phi_U$ | P | A | Lwhite $\Phi_T$ | Lblack $\Phi_U$ | CR |
|---|---|---|---|---|---|---|---|
| 5° | 19° | 14° | −50° 40° | −26° 64° | 0.993 | 0.00065 | 1529 |
| 10° | 14° | 4° | −55° 35° | −31° 59° | 0.993 | 0.00047 | 2096 |

TABLE 5 example of solutions for different elastic uncoupling values for (Δnd = 230 nm; $\Phi_{opt}$ = −163.5°; λ = 550 nm), Φ* free

| DE | Φ* | $\Phi_U$ | P | A | Lwhite $\Phi_T$ | Lblack $\Phi_U$ | CR |
|---|---|---|---|---|---|---|---|
| 5° | 11.5° | 6.5° | −50° 40° | −33.5° 56.5° | 0.997 | 0.0066 | 151 |
| 10° | 6.5° | −3.5° | −55° 35° | −38.5° 51.5° | 0.997 | 0.0083 | 119 |

TABLE 6 example of solutions for different elastic uncoupling values for (Δnd = 310 nm; λ = 550 nm), with Φ* imposed at 0°

| DE | Φ* | $\Phi_U$ | P | A | Lwhite $\Phi_T$ | Lblack $\Phi_U$ | CR |
|---|---|---|---|---|---|---|---|
| 5° | 0° | −5° | −60° 30° | −35.5° 54.5° | 0.926 | 0.002 | 380 |
| 10° | 0° | −10° | −60° 30° | −34.5° 55.5° | 0.948 | 0.0017 | 544 |

TABLE 7 example of solutions for different elastic uncoupling values for (Δnd = 275 nm; λ = 550 nm), with Φ* imposed at 0°

| DE | Φ* | $\Phi_U$ | P | A | Lwhite $\Phi_T$ | Lblack $\Phi_U$ | CR |
|---|---|---|---|---|---|---|---|
| 5° | 0° | −5° | −57.5° 32.5° | −37.5° 52.5° | 0.962 | 0.00048 | 1985 |
| 10° | 0° | −10° | −60.5° 29.5° | −39.5° 50.5° | 0.978 | 0.00057 | 1706 |

TABLE 8 example of solutions for different values of elastic uncoupling for (Δnd = 230 nm; λ = 550 nm), with Φ* imposed at 0°.

| DE | Φ* | $\Phi_U$ | P | A | Lwhite $\Phi_T$ | Lblack $\Phi_U$ | CR |
|---|---|---|---|---|---|---|---|
| 5° | 0° | −5° | −54.5° 35.5° | −40° 50° | 0.987 | 0.009 | 110 |
| 10° | 0° | −10° | −58° 32° | −42.5° 47.5° | 0.993 | 0.01 | 94 |

VARIANTS OF THE INVENTION

The above disclosure relates to a levo-rotatory liquid crystal.

The invention is of course valid when the liquid crystal is dextro-rotatory.

In this case, the equivalent configurations are obtained by reversing the signs of φU and φT. The optimal orientations of the polarizer 40 and analyser 10 are obtained by reversing the signs of the P's and the A's. By way of example, the dextro-rotatory tables corresponding to tables 2', 3, 5, 6 and 8 of the levo-rotatory case are given in Tables 9, 10, 11, 12 and 13 respectively:

TABLE 9 (ex 2')

configuration "modified" in order to improve the colorimetry of the white, delay 230 nm and Φ imposed - case of a dextro-rotatory liquid crystal.

| Δnd | $\Phi_U$ imp | $\Phi_T = \Phi_U - \pi$ imp | P | A | Lwhite $\Phi_T = \Phi_U - \pi$ | Lblack $\Phi_U$ | CR | X | Y |
|---|---|---|---|---|---|---|---|---|---|
| 230 nm idem tab 2 | 0° | 180° | 52° −38° | 38° −52° | 0.978 | 0.0079 | 123 | 0.338 | 0.34 |
| 230nm modif | 0° | 180° | 70° −20° | 33° −57° | 0.83 | 0.012 | 67 | 0.317 | 0.321 |

TABLE 10 (ex 3)

example of solutions for different values of elastic uncoupling for (Δnd = 310 nm; $\Phi_{opt}$ = −149°; λ = 550 nm), Φ* free - case of a dextro-rotatory liquid crystal.

| DE | Φ* | $\Phi_U$ | P | A | Lwhite $\Phi_T$ | Lblack $\Phi_U$ | CR |
|---|---|---|---|---|---|---|---|
| 5° | −26° | −21° | 50° −40° | 19° −71° | 0.989 | 0.0098 | 101 |
| 10° | −21° | −11° | 55° −35° | 24° −66° | 0.989 | 0.0066 | 150 |

TABLE 11 (ex 5)

example of solutions for different values of elastic uncoupling for (Δnd = 230 nm; $\Phi_{opt}$ = −163.5°; λ = 550 nm), Φ* free - case of a dextro-rotatory liquid crystal.

| DE | Φ* | $\Phi_U$ | P | A | Lwhite $\Phi_T$ | Lblack $\Phi_U$ | CR |
|---|---|---|---|---|---|---|---|
| 5° | −11.5° | −6.5° | 50° −40° | 33.5° −56.5° | 0.997 | 0.0066 | 151 |
| 10° | −6.5° | 3.5° | 55° −35° | 38.5° −51.5° | 0.997 | 0.0083 | 119 |

TABLE 12 (ex 6)

example of solutions for different values of elastic uncoupling for (Δnd = 310 nm; λ = 550 nm), with Φ* imposed at 0° - case of a dextro-rotatory liquid crystal.

| DE | Φ* | $\Phi_U$ | P | A | Lwhite $\Phi_T$ | Lblack $\Phi_U$ | CR |
|---|---|---|---|---|---|---|---|
| 5° | 0° | 5° | 60° −30° | 35.5° −54.5° | 0.926 | 0.002 | 380 |
| 10° | 0° | 10° | 60° −30° | 34.5° −55.5° | 0.948 | 0.0017 | 544 |

TABLE 13 (ex 8)

example of solutions for different values of elastic uncoupling for (Δnd = 230 nm; λ = 550 nm), with Φ* imposed at 0° - case of a dextro-rotatory liquid crystal.

| DE | Φ* | $\Phi_U$ | P | A | Lwhite $\Phi_T$ | Lblack $\Phi_U$ | CR |
|---|---|---|---|---|---|---|---|
| 5° | 0° | 5° | 54.5° −35.5° | 40° −50° | 0.987 | 0.009 | 110 |
| 10° | 0° | 10° | 58° −32° | 42.5° −47.5° | 0.993 | 0.01 | 94 |

REFERENCES

Document [1]: patent FR 2740894

Document [2]: "Fast bistable nematic display using monostable surface anchoring switching" Proceeding SID 1997, p 41-44

Document [3]: "Fast bistable nematic display from coupled surface anchoring breaking" SPIE vol. 3015 (1997), p 61-69

Document [4]: patent U.S. 2003/0076455

Document [5]: "Dynamic flow, broken surface anchoring, and switching bistability in three-terminal twisted nematic liquid crystal displays" Journal of Applied Physics, vol 90, no. 6, p 3121-3123 (2001)

Document [6]: patent FR 2808891

Document [7]: "Optical optimisation of surface controlled bistable twisted nematic liquid crystal displays" Proceeding SID 2000, p 241-243

Document [8]: patent FR 2808890

Document [9]: "Thin Crystal film polarizers and retarders", Proc of SPIE vol 4658, p 79-90. 2002

Document [10]: "Reflective bistable nematic displays (BiNem®) fabricated by standard manufacturing equipment", Journal of the SID 11/1.2003, 217-224

Document [11]: H. L. Ong "Origin and characteristics of the optical properties of general twisted nematic liquid crystal displays" J. Apply. Phys. 64, 614 (1988)

Document [12]: P. Yeh and C. Gu "Optics of liquid crystal displays", Wiley, New York, 1999

Document [13]: Poincare H., Théorie mathématique de la lumiére, Gauthiers Villars (1889)

Document [14]: Schurcliff W. A. "Polarized light, production and use" Harvard University Press (1966)

The invention claimed is:

1. Nematic liquid crystal display device having two stable states, without an electric field, that are obtained by anchoring break, characterized by the fact that it comprises two polarizers (10, 40), the first polarizer (10) being placed on the side of the observer, the other polarizer (40) being placed on the opposite side of the liquid crystal cell and said other polarizer being at least partially reflecting in order to define a reflective or transflective mode, the orientation of the two polarizers (10, 40) being shifted by a value equal to the rotatory power of the cell at approximately +/−30°.

2. Device according to claim 1, characterized by the fact that the orientation of the polarizer (40) placed on the opposite side with respect to the observer, as referring to the nematic director on the associated face of the cell, being comprised within the range containing the sub-range + or − (10° to 80°) whilst the orientation of the polarizer (10) placed on the side of the observer, as referring to the same nematic director reference, is comprised within the range comprising the sub-range from + or − (10° to 80°) for an optical delay Δnd of the order of 250±70 nm.

3. Device according to claim 1, characterized by the fact that for an optical delay Δnd=250+/−70 nm, in the case of a levo-rotatory liquid crystal, the orientation of the polarizer (40) placed on the opposite side with respect to the observer, as referring to the nematic director on the associated face of the cell, is comprised within the range [−75°; −30°] U [10°; 65°], whilst the orientation of the polarizer (10) placed on the side of the observer, as referring to the same nematic director reference, is comprised within the range [−60°; −10°] U [30°; 80°], and in the case of a dextro-rotatory liquid crystal, the orientation of the polarizer (40) placed on the opposite side with respect to the observer, as referring to the nematic director on the associated face of the cell, is comprised within the range [−65°; −10°] U [30°; 75°], whilst the orientation of the polarizer (10) placed on the side of the observer, as referring to the same nematic director reference, is comprised within the range [−80°; −30°] U [10°; 60°].

4. Device according to claim 1, characterized by the fact that for an optical delay Δnd=280+/−30 nm, in the case of a levo-rotatory liquid crystal and for brushing directions forming between themselves between 15° and 30°, the orientation of the polarizer (40) placed on the opposite side with respect to the observer, as referring to the nematic director on the associated face of the cell, is comprised within the range [−65°; −30°] U [25°; 65°] preferentially [−50°; −40°] U [40°; 50°], whilst the orientation of the polarizer (10) placed on the side of the observer, as referring to the same nematic director reference, is comprised within the range [−40°; −10°] U [50°; 80°] preferentially [−25°; −10°] U [64°; 80°], and in the case of a dextro-rotatory liquid crystal, for brushing directions forming between themselves between −15° and −30°, the orientation of the polarizer (40) placed on the opposite side with respect to the observer, as referring to the nematic director on the associated face of the cell, is comprised within the range [−65°; −25°] U [30°; 65°] preferentially [−50°; −40°] U [40°; 50°], whilst the orientation of the polarizer (10) placed on the side of the observer, as referring to the same nematic director reference, is comprised within the range [−80°; −50°] U [10°; 40°] preferentially [−80°; −64°] U [10°; 25°].

5. Device according to claim 1, characterized by the fact that for an optical delay Δnd=220+/−30 nm, in the case of a levo-rotatory liquid crystal and for brushing directions forming between themselves between 10° and 20°, the orientation of the polarizer (40) placed on the opposite side with respect to the observer, as referring to the nematic director on the associated face of the cell, is comprised within the range [−60°; −30°] U [25°; 65°] preferentially [−50°; −40°] U [40°; 50°], whilst the orientation of the polarizer (10) placed on the side of the observer, as referring to the same nematic director reference, is comprised within the range [−40°; −20°] U [50°; 70°] preferentially [−35°; −25°] U [55°; 65°], and in the case of a dextro-rotatory liquid crystal, for brushing directions forming between themselves between −10° and −20°, the orientation of the polarizer (40) placed on the opposite side with respect to the observer, as referring to the nematic director on the associated face of the cell, is comprised within the range [−65°; −25°] U [30°; 60°] preferentially [−50°; −40°] U [40°; 50°], whilst the orientation of the polarizer (10) placed on the side of the observer, as referring to the same nematic director reference, is comprised within the range [−70°; −50°] U [20°; 40°] preferentially [−65°; −55°] U [25°; 35°].

6. Device according to claim 1, characterized by the fact that for an optical delay Δnd=280+/−30 nm, in the case of a levo-rotatory liquid crystal and for brushing directions forming between themselves between 0° and +/−5°, the orientation of the polarizer (40) placed on the opposite side with respect to the observer, as referring to the nematic director on the associated face of the cell, is comprised within the range [−75°; −35°] U [15°; 55°] preferentially [−60°; −50°] U [30°; 40°], whilst the orientation of the polarizer (10) placed on the side of the observer, as referring to the same nematic director reference, is comprised within the range [−50°; −20°] U [40°; 70°] preferentially [−40°; −30°] U [50°; 60°], and in the case of a dextro-rotatory liquid crystal, for brushing directions forming between themselves between 0° and +/−5°, the orientation of the polarizer (40) placed on the opposite side with respect to the observer, as referring to the nematic director on the associated face of the cell, is comprised within the range [−55°; −15°] U [35°; 75°] preferentially [−40°; −30°] U [50°; 60°], whilst the orientation of the polarizer (10) placed on the side of the observer, as referring to the same nematic director reference, is comprised within the range [−70°; −40°] U [20°; 50°] preferentially [−60°; −50°] U [30°; 40°].

7. Device according to claim 1, characterized by the fact that for an optical delay Δnd=220+/−30 nm, in the case of a levo-rotatory liquid crystal and for brushing directions forming between themselves between 0 and +/−5°, the orientation of the polarizer (40) placed on the opposite side with respect to the observer, as referring to the nematic director on the associated face of the cell, is comprised within the range [−65°; −40°] U [20°; 60°] preferentially [−55°; −45°] U [35°; 45°], whilst the orientation of the polarizer (10) placed on the side of the observer, as referring to the same nematic director reference, is comprised within the range [−60°; −20°] U [30°; 70°] preferentially [−45°; −35°] U [45°; 55°], and in the case of a dextro-rotatory liquid crystal, for brushing directions forming between themselves between 0° and +/−5°, the orientation of the polarizer (40) placed on the opposite side with respect to the observer, as referring to the nematic director on the associated face of the cell, is comprised within the range [−60°; −20°] U [40°; 65°] preferentially [−45°; −35°] U [45°; 55°], whilst the orientation of the polarizer (10) placed on the side of the observer, as referring to the same nematic director reference, is comprised within the range [−70°; −30°] U [20°; 60°] preferentially [−55°; −45°] U [35°; 45°].

8. Device according to claim 1, characterized by the fact that for an optical delay Δnd=220+/−30 nm, in the case of a levo-rotatory liquid crystal and for brushing directions forming between themselves between 0° and +/−5°, the orientation of the polarizer (40) placed on the opposite side with respect to the observer, as referring to the nematic director on the associated face of the cell, is comprised within the range [−80°; −50°] U [10°; 60°] whilst the orientation of the polarizer (10) placed on the side of the observer, as referring to the same nematic director reference, is comprised within the range [−50°; −25°] U [45°; 65°], and in the case of a dextro-rotatory liquid crystal, for brushing directions forming between themselves between 0° and +/−5°, the orientation of the polarizer (40) placed on the opposite side with respect to the observer, as referring to the nematic director on the associated face of the cell, is comprised within the range [−60°; −10°] U [50°; 80°], whilst the orientation of the polarizer (10) placed on the side of the observer, as referring to the same nematic director reference, is comprised within the range [−65°; −45°] U [25°; 50°].

9. Device according to claim 1, characterized by the fact that for an optical delay Δnd=280+/−30 nm, in the case of a levo-rotatory liquid crystal and for brushing directions forming between themselves between 5° and 30°, taking account of an elastic uncoupling between 1° and 12°, the orientation of the polarizer (40) placed on the opposite side with respect to the observer, as referring to the nematic director on the associated face of the cell, is comprised within the range [−65°; −45°] U [25°; 55°], whilst the orientation of the polarizer (10) placed on the side of the observer, as referring to the same nematic director reference, is comprised within the range [−40°; −10°] U [50°; 80°], and in the case of a dextro-rotatory liquid crystal, for brushing directions forming between themselves between −5° and 30°, taking account of an elastic uncoupling between 1° and 12°, the orientation of the polarizer (40) placed on the opposite side with respect to the observer, as referring to the nematic director on the associated face of the cell, is comprised within the range [−55°; −25°] U [45°; 65°], whilst the orientation of the polarizer (10) placed on the side of the observer, as referring to the same nematic director reference, is comprised within the range [−80°; −50°] U [10°; 40°].

10. Device according to claim 1, characterized by the fact that for an optical delay Δnd=220+/−30 nm, in the case of a levo-rotatory liquid crystal and for brushing directions forming between themselves between 5° and 15°, taking account of an elastic uncoupling between 1° and 12°, the orientation of the polarizer (40) placed on the opposite side with respect to the observer, as referring to the nematic director on the associated face of the cell, is comprised within the range [−65°; −40°] U [25°; 50°] preferentially [−60°; −45°] U [30°; 45°], whilst the orientation of the polarizer (10) placed on the side of the observer, as referring to the same nematic director reference, is comprised within the range [−50°; −20°] U [40°; 65°] preferentially [−40°; −30°] U [48°; 60°], and in the case of a dextro-rotatory liquid crystal, for brushing directions forming between themselves between −5° and −15°, taking account of an elastic uncoupling between 1° and 12°, the orientation of the polarizer (40) placed on the opposite side with respect to the observer, as referring to the nematic director on the associated face of the cell, is comprised within the range [−50°; −25°] U [40°; 65°] preferentially [−45°; −30°] U [45°; 60°], whilst the orientation of the polarizer (10) placed on the side of the observer, as referring to the same nematic director reference, is comprised within the range [−65°; −40°] U [20°; 50°] preferentially [−60°; −48°] U [30°; 40°].

11. Device according to claim 1, characterized by the fact that for an optical delay Δnd=250+/−70 nm, in the case of a levo-rotatory liquid crystal and for brushing directions forming between themselves between 0° and +/−5°, taking account of an elastic uncoupling between 1° and 12°, the orientation of the polarizer (40) placed on the opposite side with respect to the observer, as referring to the nematic director on the associated face of the cell, is comprised within the range [−70°; −40°] U [20°; 55°], whilst the orientation of the polarizer (10) placed on the side of the observer, as referring to the same nematic director reference, is comprised within the range [−60°; −25°] U [30°; 65°], and in the case of a dextro-rotatory liquid crystal, for brushing directions forming between themselves between 0° and +/−5°, taking account of an elastic uncoupling between 1° and 12°, the orientation of the polarizer (40) placed on the opposite side with respect to the observer, as referring to the nematic director on the associated face of the cell, is comprised within the range [−55°; −20°] U [40°; 70°], whilst the orientation of the polarizer (10) placed on the side of the observer, as referring to the same nematic director reference, is comprised within the range [−65°; −30°] U [25°; 60°].

12. Device according to claim 1, characterized by the fact that the ratio between the thickness d of the cell and the spontaneous pitch $p_o$ of the liquid crystal molecules is approximately equal to 0.25+/−0.1, preferably 0.25±0.05.

13. Device according to claim 1, characterized by the fact that the two stable states correspond to two textures of liquid crystal molecules the twist of which differs from 150° to 180° in absolute values.

14. Device according to claim 1, characterized by the fact that the passing-state is obtained with the texture with the strongest twist.

15. Method for the optimization of the orientation of two polarizers (10, 40) in a nematic liquid crystal display device presenting two stable states, without an electric field, that are obtained by anchoring break, one of the polarizers (10) being placed on the partially reflecting side in order to define a reflective or transflective mode, characterized by the fact that it comprises the steps consisting of orientating the two polarizers (10, 40) such that they are shifted by a value equal to the rotatory power of the cell at approximately +/−30°.

16. Method according to claim 15, characterized by the fact that it comprises the steps consisting of:
calculating the rotatory power PR using a formula which utilizes the optical delay Δnd, the twist Φ and the wavelength λ,
fixing the orientation A of the output polarizer (10) equal to P+PR, P representing the orientation of the polarizer (40) on the opposite side with respect to the observer and PR the rotatory power,
researching the values of P which produce the lowest resultant transmission value for the twist Φ increased by λ and
deducing A from it.

17. Method according to claim 16, characterized by the fact that the rotatory power PR is calculated on the basis of the relationship:

$$PR \cong \phi - \arctg\left(\frac{\phi}{X} tgX\right) \quad [3]$$

with $$X(\phi, \lambda) = \sqrt{\phi^2 + \left(\frac{\pi \Delta nd}{\lambda}\right)^2}. \quad [2]$$

18. Method according to claim 16, characterized by the fact that the transmission value is defined by the relationship:

$$Trs(\phi, \lambda) = \quad [1]$$
$$\cos^2(\alpha + \beta) - \cos^2 X \cos 2\alpha \cos 2\beta \left[\frac{\phi}{X}\tan X - \tan 2\alpha\right]\left[\frac{\phi}{X}\tan X + \tan 2\beta\right].$$

19. Method according to claim 16, characterized by the fact that the rotatory power PR is calculated on the basis of an optimal twist value Φopt determined on the basis of the relationship:

$$\phi_{opt} = \pi\sqrt{1-\left(\frac{\Delta nd}{\lambda_0}\right)^2}. \qquad [6]$$

20. Method according to claim 16, characterized by the fact that the rotatory power PR is calculated on the basis of a twist value imposed by the azimuthal anchoring.

21. Method according to claim 16, characterized by the fact that it comprises a step of adapting the angles of the polarizers in order to improve the colorimetric neutrality of the white obtained.

22. Method according to claim 16, characterized by the fact that the rotatory power PR is calculated on the basis of a twist value which integrates an uncoupling (DE) resulting from a finite azimuthal anchoring.

\* \* \* \* \*